United States Patent [19]
Louis et al.

[11] 4,020,960
[45] May 3, 1977

[54] SLAG POT TRANSFER TRAILER
[75] Inventors: Charles R. Louis, Trenton; Lawrence J. Ulanski, Holly, both of Mich.
[73] Assignee: Ford Motor Company, Dearborn, Mich.
[22] Filed: June 7, 1976
[21] Appl. No.: 693,405
[52] U.S. Cl. .............................................. 214/390
[51] Int. Cl.² ............................................. B60P 3/00
[58] Field of Search .......... 214/390, 350, 501, 502, 214/313, 314; 254/2 R, 2 C, 3 R, 3 C
[56] References Cited
UNITED STATES PATENTS
3,330,429  7/1967  Kress .............................. 214/390 X
3,378,155  4/1968  Steiner ............................ 214/390

Primary Examiner—Robert G. Sheridan
Attorney, Agent, or Firm—Joseph W. Malleck; Keith L. Zerschling

[57] ABSTRACT

A conveyance apparatus for heavy industrial ladles, such as slag pots, is disclosed. The apparatus comprises a U-shaped frame aligned in a horizontal plane and supported on a chassis for rolling movement, the chassis employing a yoke assembly for more stable support. A lift assembly has crank arms journaled atop each leg of the frame and each have a lever arm depressable by an actuator assembly which, in turn, elevates a trunnion seat assembly carried by the lift arm of each crank. The seat assembly has engaging surfaces arranged to secure the ladle trunnions in place on the crank arms. The entire lift assembly provides an elevation silhouette no greater than the height of the ladle in the raised position.

4 Claims, 6 Drawing Figures

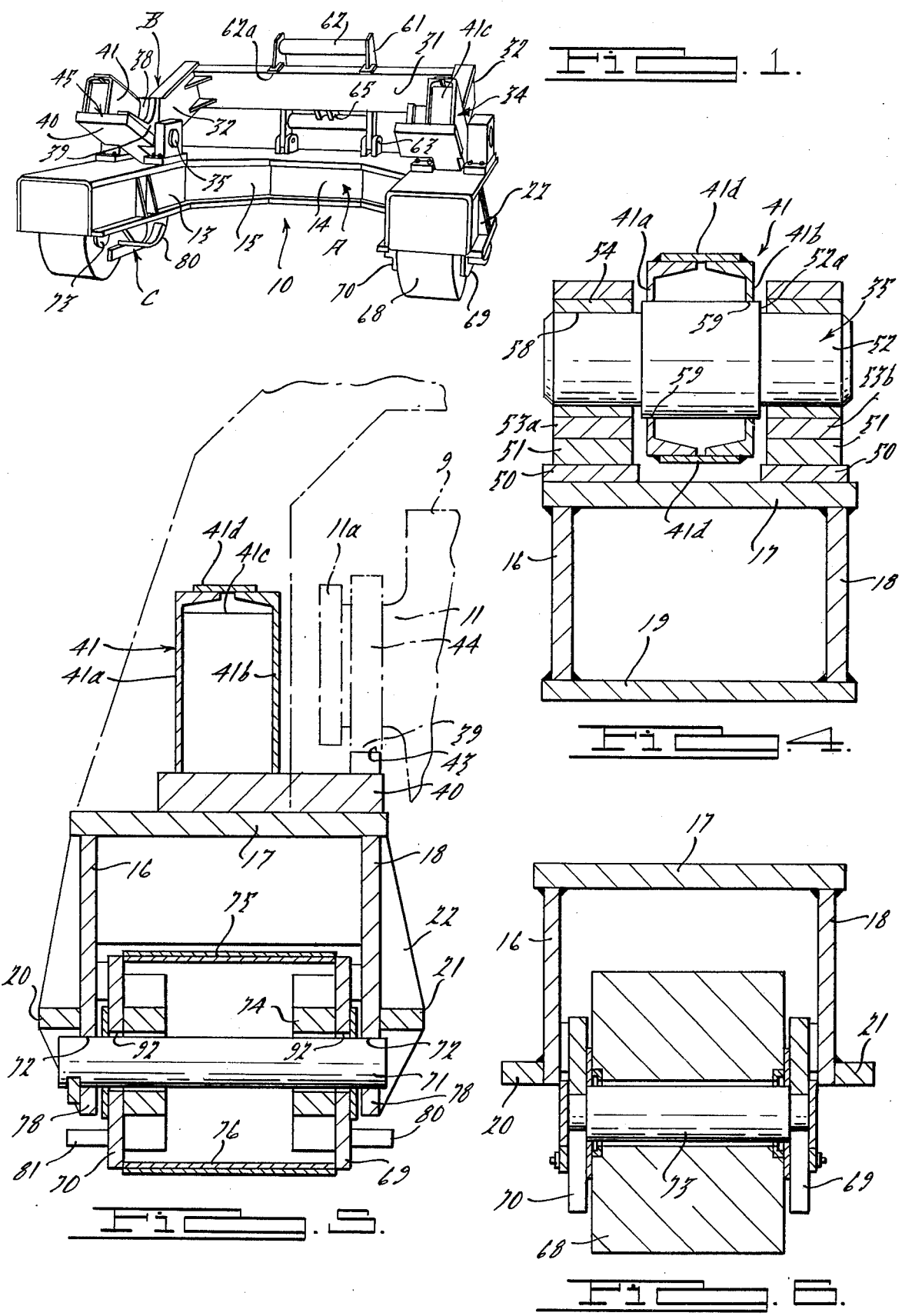

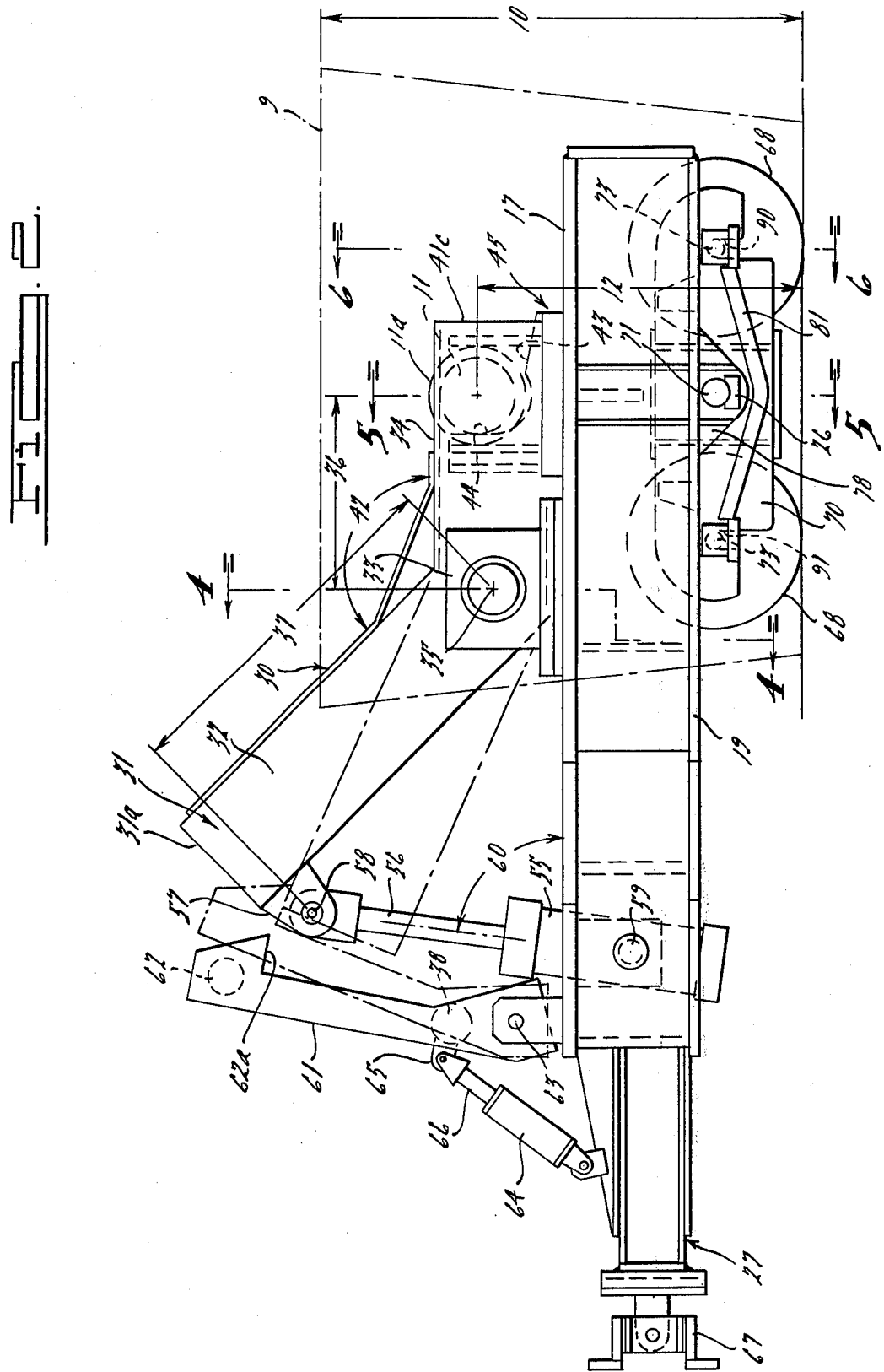

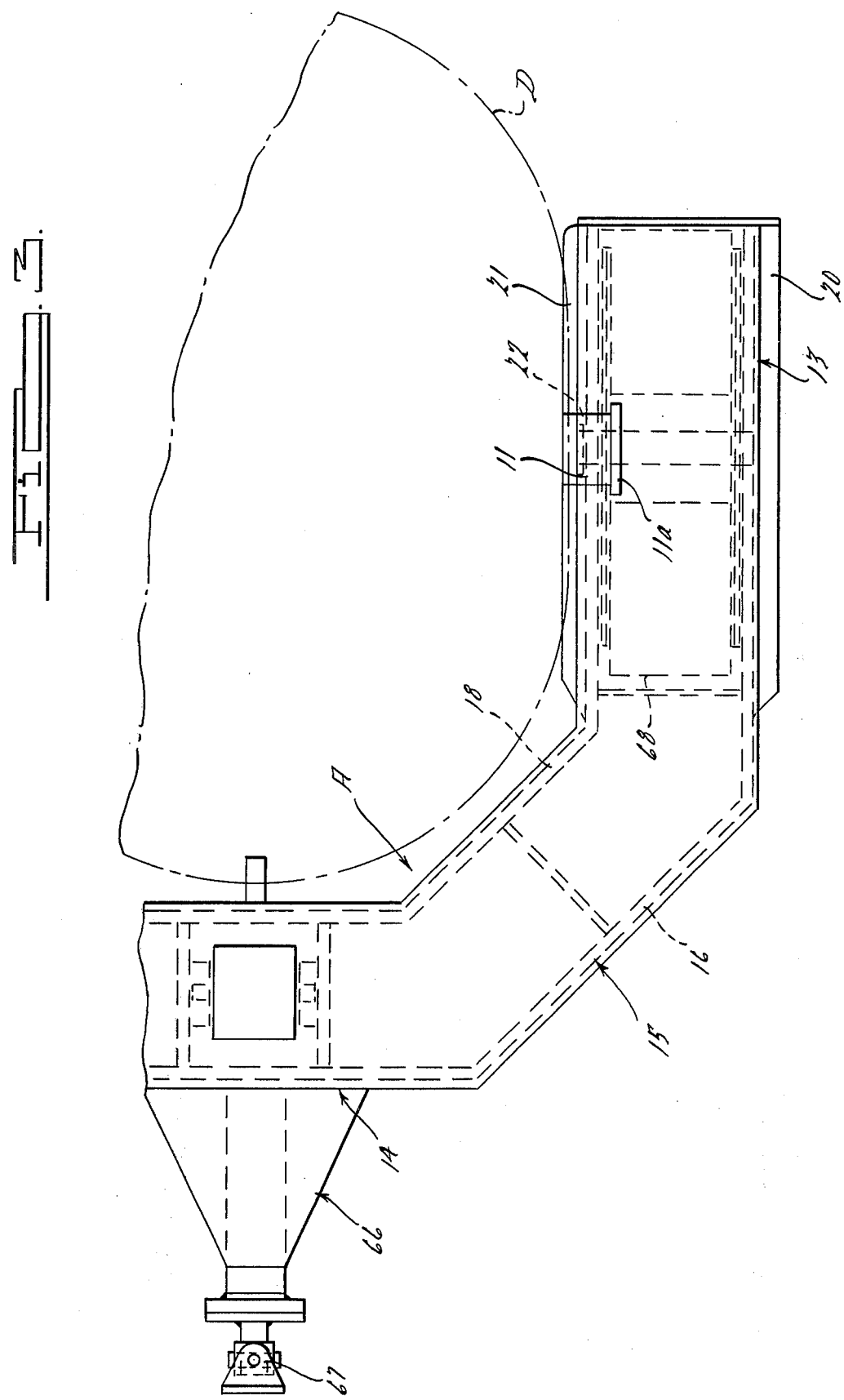

4,020,960

SLAG POT TRANSFER TRAILER

BACKGROUND OF THE INVENTION

The slag formed in the cupola or blast furnace must be removed continuously or intermittently. If the volume of slag is small, it may be run out on a dry sand bed and carried with the bottom drop. But large volumes of slag must be run out into suitable slag pots, which are cooled and taken to a slag dump for slag disposal. Due to the weight of such slag pots, overhead cranes have been consistently employed to carry the pots within the melt shop building. However, the availability of such cranes is limited due to their use for many other melt shop tasks and thus are at a use premium. Cranes also are generally slow in movement and are limited to a path beneath the crane supporting structure. This has necessitated additional equipment, such as expensive straddle trucks which meet the pots at exposed loading platforms, having been carried there by cranes. There is need to overcome the disadvantages of such dual transportation network, and to overcome the general slowness and inflexibility of such system.

SUMMARY OF THE INVENTION

The primary object of this invention is to provide an improved conveyance system for large volume slag pots within an iron or steel making plant.

Another object of this invention is to provide a mobile unit which operates independently of any predetermined track system, and has a low profile substantially the same as the slag pot height whereby such mobile unit can convey such pots through aisles and areas normally inaccessible to any other type of unit.

Specific features pursuant to the above objects comprise (a) the use of a carriage which can be towed or moved by motorized power, the carriage having a horizontally disposed frame which straddles the sides of the slag pot rather than the open top, (b) the use of a pair of elbow cranks pivotally supported on said horizontal frame having one arm effective to engage the slag pot trunnions and another arm which is hydraulicly actuated to provide a low lifting profile, (c) the use of a bogey pin support which acts as a chassis for the horizontal frame to center the wheel support in line with the center of mass of the slag pot.

SUMMARY OF THE DRAWINGS

FIG. 1 is a perspective view of the conveyance apparatus according to this invention;

FIG. 2 is an enlarged side elevational view of the conveyance apparatus showing the crank angles in one position of operation;

FIG. 3 is a partial plan view of the structure of FIG. 2;

FIG. 4 is a large sectional taken substantially along line 4—4 of FIG. 2;

FIG. 5 is an enlarged sectional view taken substantially along line 5—5 of FIG. 2; and FIG. 6 is an enlarged sectional view taken substantially along line 6—6 of FIG. 2.

DETAILED DESCRIPTION

Turning to FIGS. 1–3, the frame assembly A is adapted to extend in a generally horizontal plane and snugly fit about the exterior contour of a slag pot or ladle D, said slag pots having an upper extremity 9 at a predetermined height 10; trunnions 11 extend outwardly from opposite sides of the ladle with their centers at a predetermined height 12 taken with respect to the floor upon which the ladle is rested. Frame A is generally U-shaped having a pair of legs 13 on opposite sides of the ladle adjacent each of said trunnions; the frame has a hip 14 extending at right angles to said legs and is adjacent the other side of said slag pot. The hip and legs are interconnected by a pair of knees 15 which are generally disposed at a 45° angle with respect to each of said hip and legs. The hip, knees and legs of said frame are constructed of heavy duty steel plate formed as a channel; the channel is three-sided when extending over the chassis C and is generally four-sided in the remainder. In essence, the frame is constructed as a box or channel column, made up of welded steel plates; suitable reinforcing ribs 20 and 21 may be further employed, along with webs 22 to add additional strength to said frame.

A lift assembly B is disposed on frame A and includes a pair of cranks 30 which are joined by a common handle 31; each of the cranks is configured as an angular lever consisting of an upper arm 32, an elbow 33 and a lower arm 34. The elbow is pivotally carried upon a journal 35. The lower arm has a dimension 36 (extending from the center of the journal axis to the center of the point of lifting of the trunnion of the ladle) which is approximately ½ the lever length 37 of the upper arm, the latter extending from the center of the journal to the axis at which the hydraulic lift force is applied. Each crank is constructed of steel plates forming a beam; the beam particularly has channels 41a and 41b facing each other, said channels being joined together by welded top and bottom plates 41d and by an end plate 41c (employed at the extremity of the lower arm). A lifting hand 45 or trunnion seat assembly is carried by each crank at the extremity of the lower arm 34. The hand comprises a thick horizontally extending plate 40 rigidly joined to the beam 41 and is offset inwardly of the frame. Webbing 39 extends upwardly from the inner margin of the plate 40 and is braced by shoulder plate 38. The webbing has a camming and engaging surface (defined in two parts) on the upper edge thereof. The lower surface 43 is a flat inclined surface to assist the trunnions of the slag pot to ride over the webbing when positioning the frame A along side the pot D. Upper surface 44 is generally parabolic having the lower most section conforming to the radius of the trunnion 11 and an upper most section acting as a stop surface to limit horizontal movement of the frame when abutment occurs. Surface 44 acts as the direct contact lifting surface to the slag pot.

The included angle between the upper and lower arms is approximately 120° permitting the upper extremity 31a of the interconnecting handle to be at a height substantially the same as the upper level of the slag pot when the crank is moved to the pot lifting position, (see dotted outline in FIG. 2).

Each journal assembly 35 for the crank 30 is comprised of a pair of journal supports 53a and 53b which are disposed to stand in an upright direction upon pads or blocks 50 and 51 which are in turn welded to the top of the frame A. Circular openings 58 are defined in each of the journal supports and are adapted to receive a cylindrical bearing 54. A journal shaft 52 extends between said general supports and through each of said bearings 54; said shaft has steps 52a defining an enlarged central section which extends through the elbow 33 of a crank, said steps limiting the lateral movement of said shaft within said journal supports. Opening 59 in said channels receives the enlarged stepped portion of the shaft 52.

The cranks 30 are operated for movement by way of an assembly comprised of a hydraulic pressure actuator 55 pivotally mounted at opposite ends thereof. The housing of the actuator 55 is pivotally journalled at 59 and the piston 60 rod, operating within said actuator, has its outer extremity pivotally joined to a coupling plate 57 at 58; the plates in turn are joined to the cross beam 31 interconnecting said cranks. The pivotal mounting for said actuator is arranged so that the angle of the piston rod with respect to the horizontal plane of frame A is about 10 (between the nonlift and lift positions of the cranks).

To stabilize the crank arms carrying the heavy weight of the slag pot in the raised position, a safety lock assembly is employed. Such assembly comprises a pair of latch members 61, interconnected by a pair of cross members 38 and 62, said latches being pivotally mounted at their lower extremity about a pivot 63. The upper ends of each of said latches carries a latching surface 62a adapted to engage the upper corner of the cross beam 31 connecting the crank arms, when the cross beam is in a withdrawn position such as shown in dotted outline in FIG. 2. The latches 61 are actuated by way of an actuator assembly 64 having a piston rod 66 pivotally engaging a coupling plate 65 attached to the lower cross member 38. The opposite end of the actuator 64 is pivotally attached to said frame. Thus, the latch members may be withdrawn or moved to a locking position as selected by the operator.

The chassis C for the conveyor is comprised of a suspension assembly which interconnects a pair of tandum wheels 68 with the frame A. The suspension assembly includes a pair of upright side suspension yokes 69 and 70 (see FIG. 5) formed out of steel plate. The yokes are rigidly joined together by top and bottom plates 75 and 76 respectively. Slots 90 and 91 are defined in the remote ends of each of said suspension yokes adapted to receive the ends of axles 73 about which each of the wheels 68 are mounted. The suspension yoke in turn supports the frame A by way of a bogey pin 71 which extends through opening 92 in the suspension yokes and extend through openings 72 in tongues 78 depending from the frame A. A positioning member 26 may be employed to hold the pin 71 in place. Bumper bars 80 and 81 are mounted on opposite sides of the suspension yokes for purposes of protecting said suspension against side impact.

The frame A further includes a towing assembly 27 which extends forwardly in the same general plane of the frame. A towing coupling 67 is attached at the most remote apex thereof. The downward or tongue weight upon the towing vehicle for the assembly as shown in FIG. 2 would be approximately 12,000 lbs.

In operation, the horizontal frame A is wheeled to position about a slag pot resting upon the floor of a manufacture plant. The frame is moved so that the surfaces 43 of trunnion seat assembly are engaged by the trunnions 11 of the slag pot with the lips 11a of the trunnions positioned outwardly of webbing 39. As the frame A is pushed further into a position aligning the trunnions with the seat assembly 45, the trunnions are forced to cam upwardly over surface 43 into the cradling surfaces 44 for a snug lifting relationship. When in such cradled position, the actuator assembly is energized to lower the upper arm 32 of the cranks 30 to the position shown in dotted outline in FIG. 2. In so doing, the trunnions of the slag pot are raised a distance approximately 7 inches, and are thus elevated from the floor. To assure stable travel of such slag pot in the raised position, the latching assembly is motivated to swing the latches 61 with surface 62a engaging the upper part of the cross beam 31 of the cranks. In this position the cranks are unable to revert back to their position in full line and thus are stabilized.

We claim:

1. An apparatus for conveying large volume ladles of the type useful in heavy metallurgical industries, the apparatus comprising:
    a. a frame having a U-shaped configuration disposed in a generally horizontal plane, said U-shaped configuration defining a yoke effective to fit about the ladle to be conveyed, said yoke having legs straddling opposite sides of said ladle and effective to engage trunnions on said ladle for lifting same, the spacing between said legs being slightly greater but close to the diameter of said ladle,
    b. a lift assembly having cranks pivotally supported on each of said legs of said yoke and extending along said opposite sides of said ladle, each crank having angled arms defining an included angle of about 120°, the lever arms of said crank being proportioned to provide maximum lifting with the arms maintained below the silhouette of said ladle in a lifted position.

2. An apparatus for conveying large volume ladles of the type useful in heavy metallurgical industries, each ladle having a pair of trunnions extending outwardly from opposite sides thereof, said apparatus comprising:
    a. a frame defining a horizontally disposed yoke having legs effective to straddle a horizontal section of said ladle immediately beneath said trunnions,
    b. means supporting said frame for rolling movement and supporting the upper plane of said frame at a height no greater than the mid height of said ladle when resting on the same surface upon which said support means is rolling, and
    c. a lift assembly having commonly actuated cranks pivotally supported on each of said legs, each crank consisting of a lower arm and an upper arm with the lower arm being aligned with said frame in the nonlift position, said lower arm having a length effective to move the extremity thereof remote from the pivot a predetermined distance equivalent to the height, said ladle is desired to be raised, said upper arm having a length effective to maintain any portion thereof below the height of said ladle when the cranks and ladle are in the lift position, said upper arm making an included angle with said lower arm between 120°–160°.

3. The conveyance apparatus as in claim 2, in which said support means further comprises a tandum pair of wheels arranged along and beneath each leg of said yoke, said means having a suspension assembly comprising yokes supported on each tandum pair of wheels, said suspension assembly having a pin extending through the central section of said yokes and through said frame to provide a supporting connection therebetween whereby the weight of said ladle may be stably transferred to said wheel by said pin and yokes.

4. A conveyance apparatus as in claim 2, in which said lower arms of each of said cranks have a seat assembly adapted to engage said ladle trunnion for lifting, said seat assembly comprising a generally flat foot extending radially inwardly from said lower arm and carrying an upright web having defined thereon an arcuate surface adapted to define a cradle for a trunnion, said surface having an inclined portion adapted to permit said trunnions to be cammed slightly upwardly while moving said frame into position straddling said ladle, said surface also having a variable radius curved portion adapted to cradle said trunnions, upon alignment of said frame with said ladle, said trunnions dropping into and against said curved portion from said inclined portion.

* * * * *